United States Patent
Zamaraiev et al.

(10) Patent No.: US 11,757,966 B2
(45) Date of Patent: Sep. 12, 2023

(54) DETECTING SIMILAR LIVE STREAMS INGESTED AHEAD OF THE REFERENCE CONTENT

(71) Applicant: Google LLC, Mountain View, CA (US)

(72) Inventors: Valerii Zamaraiev, Kilchberg (CH); Vladimir Rychev, Adliswil (CH); Johan Granström, Kilchberg (CH)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 16/877,228

(22) Filed: May 18, 2020

(65) Prior Publication Data

US 2020/0280593 A1 Sep. 3, 2020

Related U.S. Application Data

(63) Continuation of application No. 15/370,886, filed on Dec. 6, 2016, now Pat. No. 10,659,509.

(51) Int. Cl.
*H04L 65/75* (2022.01)
*H04N 21/845* (2011.01)
(Continued)

(52) U.S. Cl.
CPC ............ *H04L 65/762* (2022.05); *G06V 20/46* (2022.01); *H04L 65/61* (2022.05);
(Continued)

(58) Field of Classification Search
CPC .............. H04L 65/602; H04L 65/4069; G06K 9/00744; H04N 21/2187; H04N 21/23418;
(Continued)

(56) References Cited

U.S. PATENT DOCUMENTS 9,207,964 B1 * 12/2015 Gwosdek .................. G06F 9/46
9,442,935 B2    9/2016 Lehtiniemi et al.
(Continued)

FOREIGN PATENT DOCUMENTS

CN    102077584 A    5/2011
CN    104365109 A    2/2015
(Continued)

OTHER PUBLICATIONS

International Search Report and Written Opinion dated Dec. 18, 2017, on application No. PCT/US2017/054143.
(Continued)

*Primary Examiner* — Thomas J Dailey
*Assistant Examiner* — Aye M Aung
(74) *Attorney, Agent, or Firm* — Lowenstein Sandler LLP

(57) ABSTRACT

A first segment of a probe media item that is transmitted as a first live-stream of an event is received. After a first delay period, whether the first segment of the probe media item is similar to a first segment of a first reference media item that is transmitted as a second live-stream of the event and received subsequent to the probe media item is determined. Responsive to determining, after the first delay period, that the first segment is similar to the first segment of the first reference media item, a remedial action in association with the probe media item is performed.

20 Claims, 6 Drawing Sheets

(51) Int. Cl.
*H04N 21/2187* (2011.01)
*H04N 21/61* (2011.01)
*H04N 21/242* (2011.01)
*H04N 21/43* (2011.01)
*H04N 21/234* (2011.01)
*H04N 21/2743* (2011.01)
*G06V 20/40* (2022.01)
*H04L 65/61* (2022.01)

(52) U.S. Cl.
CPC ... *H04N 21/2187* (2013.01); *H04N 21/23418* (2013.01); *H04N 21/242* (2013.01); *H04N 21/2743* (2013.01); *H04N 21/4302* (2013.01); *H04N 21/6125* (2013.01); *H04N 21/845* (2013.01)

(58) Field of Classification Search
CPC .............. H04N 21/242; H04N 21/2743; H04N 21/4302; H04N 21/6125; H04N 21/845
See application file for complete search history.

(56) References Cited

U.S. PATENT DOCUMENTS

| | | | |
|---|---|---|---|
| 10,009,403 B1* | 6/2018 | Cook | H04L 43/0894 |
| 10,152,479 B1 | 12/2018 | Granstrom et al. | |
| 2004/0059933 A1 | 3/2004 | Levy | |
| 2006/0238390 A1* | 10/2006 | Yi | H04N 19/94 341/87 |
| 2007/0033408 A1 | 2/2007 | Morten | |
| 2009/0154806 A1 | 6/2009 | Chang et al. | |
| 2009/0254933 A1* | 10/2009 | Gupta | H04H 20/14 725/18 |
| 2010/0061587 A1* | 3/2010 | Gupta | G06V 20/46 382/100 |
| 2012/0020436 A1 | 1/2012 | Wu et al. | |
| 2013/0052939 A1 | 2/2013 | Anniballi et al. | |
| 2013/0343598 A1* | 12/2013 | Kocks | H04N 21/23418 382/218 |
| 2014/0152760 A1 | 6/2014 | Granstrom et al. | |
| 2015/0143519 A1 | 5/2015 | Granstrom | |
| 2015/0281203 A1* | 10/2015 | Granström | G06F 16/24 726/4 |
| 2016/0094877 A1* | 3/2016 | Heffernan | H04N 21/8352 725/19 |
| 2016/0294894 A1 | 10/2016 | Miller | |
| 2016/0328398 A1* | 11/2016 | Adams | G06F 16/48 |
| 2017/0185675 A1* | 6/2017 | Arngren | G06F 16/783 |
| 2017/0279757 A1* | 9/2017 | Kereth | H04L 51/52 |

FOREIGN PATENT DOCUMENTS

| | | |
|---|---|---|
| CN | 104813357 A | 7/2015 |
| WO | 2011045424 A1 | 4/2011 |

OTHER PUBLICATIONS

International Preliminary Report on Patentability, dated Oct. 12, 2018, on application No. PCT/US2017/054143.

* cited by examiner

DETECTING SIMILAR LIVE STREAMS INGESTED AHEAD OF THE REFERENCE CONTENT

RELATED APPLICATION

This application is a continuation application of U.S. patent application Ser. No. 15/370,886, filed Dec. 6, 2016, the entire contents of which is hereby incorporated by reference herein.

TECHNICAL FIELD

This disclosure relates to the field of content sharing platforms and, in particular, detecting similar live stream content ingested ahead of the reference content.

BACKGROUND

Social networks connecting via the Internet allow users to connect to and share information with each other. Many social networks include a content sharing aspect that allows users to upload, view, and share content, such as video items, image items, audio items, and so on. Other users of the social network may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method includes identifying similar media items transmitted as live-streams of an event. The method includes receiving a first segment of a probe media item that is transmitted as a first live-stream of an event. The method also includes determining whether the first segment of the probe media item is similar to a first segment of any reference media item transmitted as another live-stream of the event and received no later than the probe media item. The method includes responsive to determining that the first segment of the probe media item is not similar to the first segment of any reference media item received no later than the probe media item, determining, after a first delay period, whether the first segment of the probe media item is similar to a first segment of a first reference media item that is transmitted as a second live-stream of the event and received subsequent to the probe media item. The method includes responsive to determining, after the first delay period, that the first segment of the probe media item is similar to the first segment of the first reference media item received subsequent to the probe media item, determining, after the first delay period, whether a second segment of the probe media item is similar to a second segment of the first reference media item. The method includes responsive to determining, after the first delay period, that the first segment and the second segment of the probe media item are respectively similar to the first segment and the second segment of the first reference media item, performing a remedial action in association with the probe media item.

In another implementation, the method includes responsive to determining that the first segment of the probe media item is not similar to the first segment of the first reference media item received subsequent to the probe media item, determining, after a second delay period, whether the first segment of the probe media item is similar to a first segment of a second reference media item that is transmitted as a third live-stream of the event and received subsequent to the probe media item. The method includes responsive to determining, after the second delay period, that the first segment of the probe media item is similar to the first segment of the second reference media item received subsequent the probe media item, determining after the second delay period whether the second segment of the probe media item is similar to a second segment of the second reference media item. The method also includes responsive to determining, after the second delay period, that the first segment and the second segment of the probe media item are respectively similar to the first segment and the second segment of the second reference media item, performing the remedial action in association with the probe media item.

In an implementation, determining whether the first segment of the probe media item is similar to a first segment of any reference media item transmitted as another live-stream of the event and received no later than the probe media item, the method includes generating a first probe fingerprint for the first segment of the probe media item. The method also includes comparing the first probe fingerprint to multiple reference fingerprints associated with multiple segments for multiple reference media items received no later than the probe media item to determine a similarity between the first segment of the probe media item and the segment of the any reference media item of the multiple reference media items.

In one implementation, determining, after a first delay period, whether the first segment of the probe media item is similar to a first segment of a first reference media item that is transmitted as a second live-stream of the event and received subsequent to the probe media item, the method includes determining the first delay period. Subsequent the first delay period, the method includes comparing the first probe fingerprint to a first reference fingerprint associated with the first segment of the first reference media item to determine a similarity between the first segment of the probe media item and the first segment of the first reference media item. Responsive to determining the similarity between the first segment of the probe media item and the first segment of the first reference media item, the method includes aggregating a first similarity value to a similarity score associated with the probe media item.

In an implementation, determining, after the first delay period, whether a second segment of the probe media item is similar to a second segment of the first reference media item, the method includes subsequent the first delay period, comparing a second probe fingerprint associated with the second segment of the probe media item to a second reference fingerprint associated with the second segment of the first reference media item to determine a similarity between the second segment of the probe media item and the second segment of the first reference media item. The method also includes responsive to determining the similarity between the second segment of the probe media item and the second segment of the first reference media item, aggregating a second similarity value to the similarity score associated with the probe media item.

In another implementation, performing a remedial action in association with the probe media item, the method includes comparing a similarity score associated with the probe media item to a first similarity threshold. The similarity score is indicative of a similarity between the probe media item and the first reference media item. Responsive to determining the similarity score is greater than or equal to a first similarity threshold, the method includes performing the remedial action. In some implementations, the remedial action includes one of sending a warning notification to a user account associated with the transmission of the probe media item, muting the probe media item, blocking a display of video content of the probe media item, or terminating the transmission of the probe media item.

In some implementations, performing a remedial action in association with the probe media item, the method includes comparing the similarity score associated with the probe media item to a second similarity threshold. The method also includes responsive to determining the similarity score is greater than or equal to the first similarity threshold and below a second similarity threshold, performing the remedial action comprising at least one of sending a warning notification to a user account associated with the transmission of the probe media item, muting the probe media item, or blocking a display of video content of the probe media item. Responsive to determining the similarity score is greater than the second similarity threshold, the method includes performing the remedial action by terminating the transmission of the probe media item.

In implementations, first delay period is within a range of 3 minutes to 15 minutes. In implementations, the probe media item is a video media item. In implementations, the probe media item is an audio media item.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
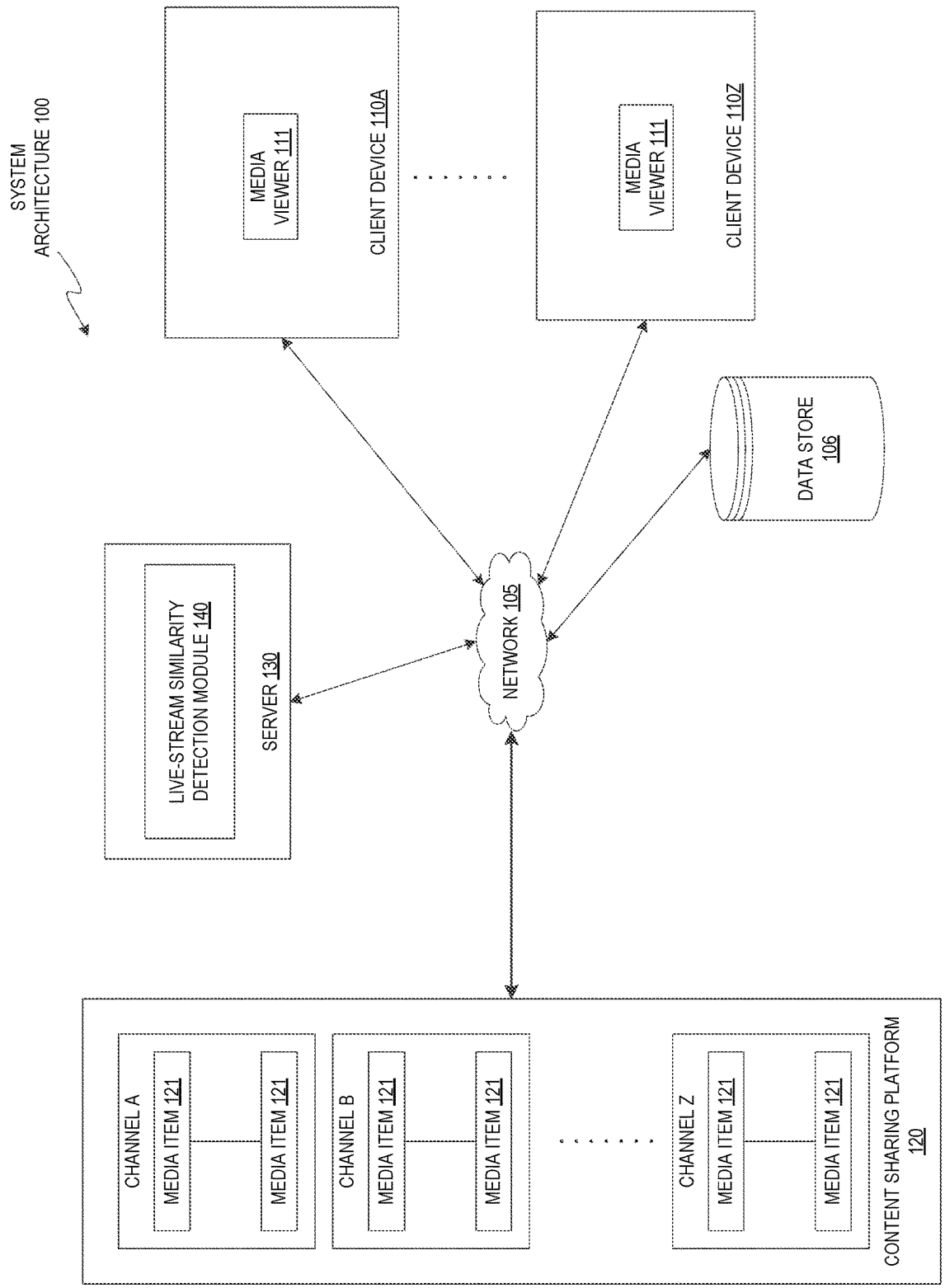
FIG. 1 illustrates an example system architecture, in accordance with one implementation of the disclosure

A media item, such as a video item (also referred to as "a video") may be uploaded to a content sharing platform by a video owner (e.g., a video creator or a video publisher who is authorized to upload the video item on behalf of the video creator) for transmission as a live-stream of an event for consumption by users of the content sharing platform via their user devices. A live-stream may be a live broadcast or transmission of a live event, where the video item is concurrently transmitted as the event occurs. The video owner (who is also a user of the content sharing platform) may desire to prevent other users from uploading video items similar to the owner uploaded video item to the content sharing platform, prevent the similar video items from being transmitted as live-streams of the event, or to impose some limitations on the use of the similar video items on the content sharing platform.

A user, other than the video owner and someone who is not authorized to upload the video item, may upload another video item to the content sharing platform for transmission as another live-stream of the event. The user uploaded video item (referred to herein as a probe video item) may be scanned against a database of signatures such as fingerprints of various video items including a fingerprint of the owner uploaded video item (referred to herein as a reference video item), to determine if the user uploaded video item (the probe video item) is similar to any video item represented in the database. If it is determined, based on the fingerprint scanning, that the probe video item is similar to the owner uploaded video item (the reference video item), the video owner may decide what should happen to the probe video item (e.g., whether a notification should be sent to a user account associated with the probe video item, or whether the probe video item should be muted, blocked, removed, monetized, tracked, etc.). However, in some instances, the probe video item may be uploaded to the content sharing platform prior to the upload of the reference video item. For instance, the upload of the reference video item may be delayed due to latency issues stemming from the owner's infrastructure limitations. With respect to the probe video item that is uploaded and subsequently transmitted as a live-stream prior to the upload of the reference video item, determining that the probe video item is similar to the reference video item may present challenges at least because the reference video item may not be available for comparison with the probe video item.

In the case where the reference media item is received after the probe media item, some systems determine if the probe media item is similar to any reference media item by taking a large chunk (e.g., 10 minutes) of the probe media item, and periodically performing lookups (e.g., comparisons to reference media items) to determine if the probe media item is similar to any reference media item. The large chunks include a significant amount of data and a single lookup using such a large chunk may be determinative as to whether the probe media item is similar to any reference media item. The same large chunk may be used to perform periodic lookups. Performing lookups using large chunks of data requires significant computational and storage resources, especially when dealing with large collections of media items and large amounts of data traffic.

Aspects of the present disclosure address the above-mentioned and other deficiencies by performing, after a delay period, a lookup of a first segment of the probe media item transmitted as a live-stream to determine that the first segment of the probe media item is similar to a first segment of a reference media item, and by performing, after the delay period and responsive to the previous lookup, a lookup of a second segment of the probe media item to determine that the second segment is similar to a second segment of a reference media item. The reference media item may be transmitted as another live-stream of the event and received subsequent to the probe media item.

In implementations, live-stream similarity detection may refer to performing a comparison between multiple segments of two media items (e.g., probe media item and reference media item) to determine a similarity between the two media items, where the reference media item is received prior to, at the same time as, or before the probe media item that is transmitted as a live stream of an event. Similarity may be an agreement or correspondence in the details or features between two media items. The probability of similarity may be a measure of the likelihood that two media items are similar, where 100% probability of similarity may indicated that two media items are an exact match and 0% probability of similarity may indicate that two media items are completely different.

As compared to periodically performing lookups using the same chunk of data, aspects of the present disclosure result in significant reduction of storage resources and significant reduction of computational (processing) resources because live-stream similarity detection compares segments of probe media item that are appreciably smaller (e.g., 1 min) than large data chunks and compares different small segments after a defined delay period rather than the same large data chunks periodically.

It may be noted that for purposes of illustration, rather than limitation, the following description describes performing live-stream similarity detection on video items. It may also be noted that multi-step sequence alignment may be performed on various data objects other than video items or media items.

For purposes of clarity and simplicity, the term "probe media item" may refer to a media item (e.g., an electronic file of a media item). For example, a probe video item refers to a video item. The term "probe segment" may refer to a segment of a probe media item. The term "probe fingerprint" may refer to one or more fingerprints of the probe media item. Likewise, the term "reference media item" may refer to another media item. For example, a reference video item refers to another video item. The term "reference segment" may refer to a segment of the reference media item. The term "reference fingerprint" may refer to one or more fingerprints of the reference media item.

FIG. 1 illustrates an example system architecture 100, in accordance with one implementation of the disclosure. The system architecture 100 includes client devices 110A through 110Z, a network 105, a data store 106, a content sharing platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data.

The data store 106 may also include multiple storage components (e.g., multiple drives or multiple databases) that may also span multiple computing devices (e.g., multiple server computers). In one implementation, data store 106 stores media items, such as video items, or fingerprints representative of segments of the media items. Fingerprints representative of segments of a media item may be referred to herein as "fingerprints."

The client devices 110A through 110Z may each include computing devices such as personal computers (PCs), laptops, mobile phones, smart phones, tablet computers, netbook computers, network-connected televisions, etc. In some implementations, client devices 110A through 110Z may also be referred to as "user devices." Each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), disapprove of ("dislike"), and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items and/or fingerprints as electronic files in one or more formats using data store 106.

In one implementation, the server 130 may be one or more computing devices (e.g., a rackmount server, a server computer, etc.). The server 130 may be included in the content sharing platform 120, be an independent system or be part of another system/platform. The server 130 may include a live-stream similarity detection module 140. The live-stream similarity detection module 140 enables the detection of a similarity between a probe media item that is uploaded to the content sharing platform 120 (e.g., as part of a channel or an independent media item) for transmission as a live-stream of an event, and a reference media item that is uploaded to the content sharing platform 120 (e.g., as part of a channel or an independent media item) for transmission as another livestream of the event. It may be noted that in some implementations, the probe media item is transmitted as a live-stream of the event, and the reference media item is not transmitted as a live-stream of the event or is transmitted as a live-stream of the event but using another content sharing platform. In some implementations, live-stream similarity detection module 140 may generate fingerprints of the media items (probe media item or reference media item) upon being received to facilitate the comparison of the media items. Alternatively, client device 110A-110Z may include a client-side fingerprint generator (not shown) that enables the generation of fingerprints for a media item. Client-side fingerprint generator may perform implementations of the disclosure independently of live-stream similarity detection module 140 of server 130, or may work in conjunction with live-stream similarity detection module 140. Although the following description may refer to live-stream similarity detection module 140 performing implementations of the disclosure, it may be understood that functionality of live-stream similarity detection module 140 may be similarly performed solely by, or in conjunction with, a client-side fingerprint generator at client device 110A-110Z.

In one implementation, the probe media item and the reference media item are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example. In one implementation, fingerprints of a video item may be fingerprints of the video component of the video item. In other implementations, fingerprints of a video item may be fingerprints of the audio component of the video item. In yet other implementations, fingerprints of a video item may be fingerprints of both the video component and audio component of the video item.

In one implementation, a user may upload a media item, such as a video item, via client device 110A. The uploaded video item may be stored in data store 106 or transmitted (nearly instantaneously apart from negligible delay) as a live-stream via client device 110B-110Z. Live-stream similarity detection module 140 may generate a multiplicity of fingerprints for the user uploaded video item (e.g., probe video item). Each of the multiplicity of fingerprints may represent different segments of fixed length (or variable length) of the probe video item. The multiplicity of fingerprints of the probe video item may be stored at data store 106. Fingerprints for other video items of content sharing platform 120, such as an owner uploaded video item (e.g., reference video item), may be generated by live-stream similarity detection module 140 or received from client device 110. Fingerprints for the video items of content sharing platform 120 may be stored at data store 106.

In one implementation, live-stream similarity detection module 140 may receive a first segment of a probe video item (e.g., the first 1-minute segment of probe media item) that is transmitted as live-stream of an event. Live-stream similarity detection module 140 may generate one or more probe fingerprints representing the first segment of the probe video item. Responsive to receiving the first segment (e.g., upon receiving the complete first 1-minute segment but before receiving the complete second 1-minute segment of the probe media item), live-stream similarity detection module 140 may perform a first lookup of the first segment of the probe video item. A lookup may refer to the comparison a probe media to a reference media item to determine a similarity between the two. In some examples, a lookup may include the comparison of one or more probe fingerprints representative of one or more segments of a probe media item to one or more reference fingerprints representative of one or more segments of a reference media item to determine the similarity. In some instances, where the reference video item is transmitted as a live-stream of the same event and transmitted no later than (prior to or at the same time as) the probe video item, live-stream similarity detection module 140 may perform an initial lookup to determine whether the first segment and a second segment of the probe video item are similar to corresponding segments of a reference video item (e.g., by comparing probe fingerprints to reference fingerprints stored in data store 106). An initial lookup may refer to one or more lookups of one or more segments of a probe media item that are performed substantially immediately after the one or more segments of probe media item are received by server 130. In some instances, where the reference video item is transmitted as a live-stream of the same event but is delayed (e.g., delayed by 3 minutes), live-stream similarity detection module 140 may, in view of the initial lookup, determine that the first segment of the probe video item is not similar to a segment of any reference video item in data store 106 because the reference video item has yet to be received. Responsive to determining, based on the initial lookup of the first segment of probe video item, that the first segment of the probe media item is not similar to a segment of any reference video item, live-stream similarity detection module 140 may initiate and perform a secondary lookup of the first segment of the probe media item after a first delay period (e.g., 5 minute delay period) to determine whether the first segment of the probe video item is similar to a first segment of a reference media item that is transmitted as another live-stream of the event and is received subsequent (e.g., after a 3 minute delay) to the probe video item. A secondary lookup may refer to one or more lookups of one or more segments of the probe media item that are performed after a delay period after the one or more segments of the probe media item are received by server 130. Responsive to determining that the first segment of the probe media item is similar to a corresponding first segment of a reference item, live-stream similarity detection module 140 may continue the secondary lookup and perform a lookup of a second segment of the probe media item after a first delay period to determine whether the second segment of the probe media item is similar to a second segment of the reference media item. Responsive to determining, based on the lookup of the first segment and second segment of the probe video item, that the first segment and the second segment of the probe video item is similar to a corresponding one of the first segment and the second segment of the first reference media item, live-stream similarity detection module 140 may perform a remedial action associated with the probe video item.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
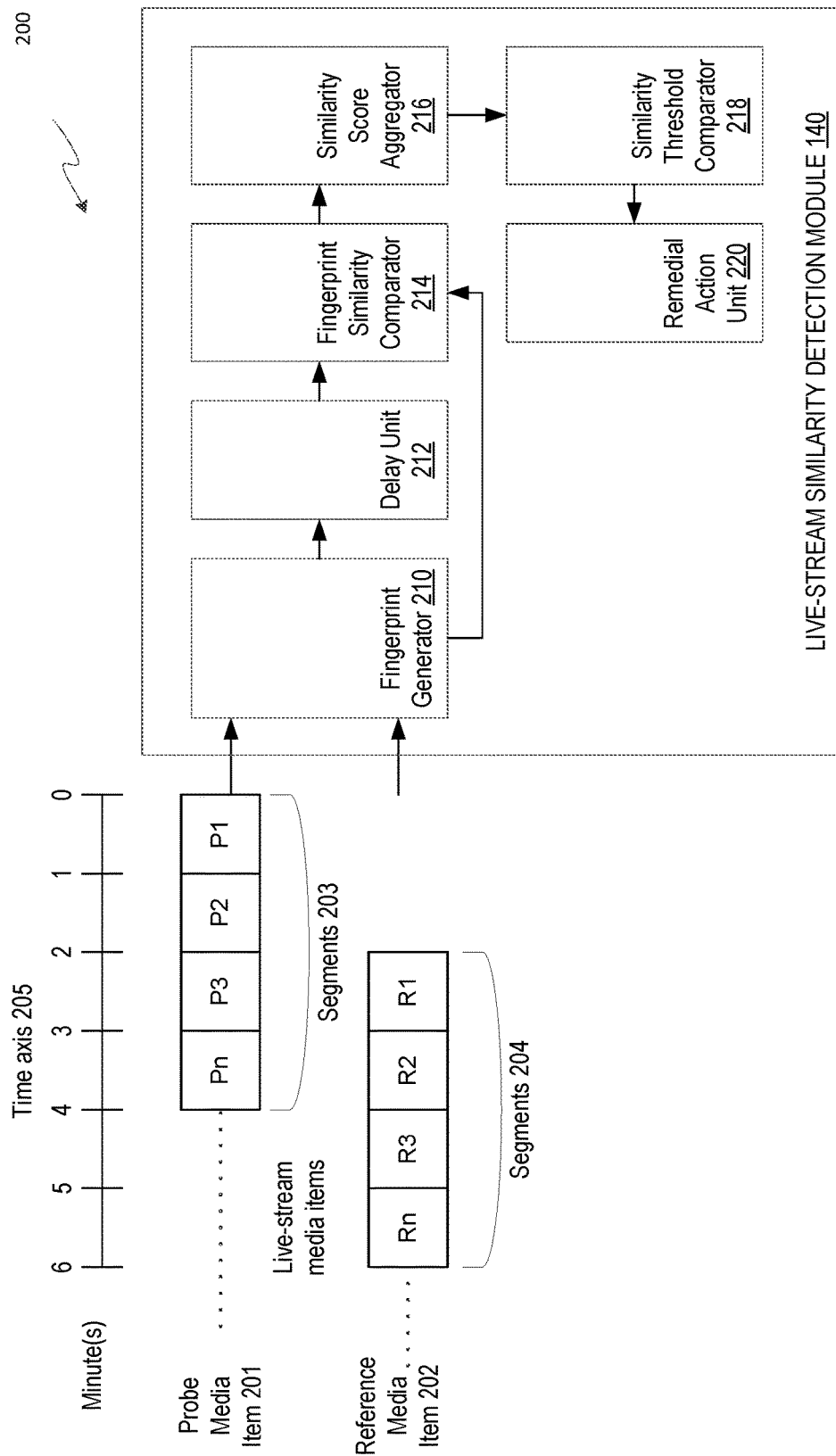
FIG. 2 is an example use of a live-stream similarity detection module, in accordance with an implementation of the disclosure.

FIG. 2 is an example use of a live-stream similarity detection module, in accordance with an implementation of the disclosure. System 200 shows live-stream similarity detection module 140, probe media item 201, and reference media item 202. System 200 may include similar features to system architecture 100 as described with respect to FIG. 1. It may be noted that features of FIG. 1 may be used herein to help describe FIG. 2. It may be noted that probe media item 201 and reference media item 202 item may both be transmitted as a live-stream of the same event. Reference media item 202 may be transmitted by the owner of the media item. Probe media item 201 may be transmitted by a user, other than the owner. It also may be noted that an initial lookup of probe media item 201 may be performed approximately immediately after a segment is received to detect a similarity of a probe media item 201 to a reference media item received prior to or at the same time as the probe media item 201. One or more lookups of individual segments 203 (P1-Pn) may be performed as part of the initial lookup. It may also be noted that one or more secondary lookups may be performed after a delay period to detect a similarity of a probe media item 201 to a reference media item 202 received after the probe media item 201. One or more lookups of individual segments 203 (P1-Pn) may be performed as part of the one or more secondary lookups.

Probe media item 201 is shown to include segments 203 (e.g., P1 to Pn) (also referred to as "probe segments"). Reference media item 202 is shown to include segments 204 (e.g., R1 to Rn) (also referred to as "reference segments"). It may be noted that probe media item 201 or reference media item 202 may include any number of segments. A segment may be a part of a media item. In some implementations, a segment may include a contiguous part of media item having a start timestamp and end timestamp different from other segments. In some implementations, segments may be non-overlapping parts of a media item. For example, time axis 205 illustrates 1 minute (min) intervals starting at time "0". Segments 203 of probe media item 201 may each be 1 minute in length. P1 may be have a start timestamp (0:00 min) and end timestamp (1:00 min), P2 may have start timestamp (1:00 min) and end timestamp (2:00 min), P3 may have start timestamp (2:00 min) and end timestamp (3:00 min). It may be noted that segments of 1 minute length are provided for purposes of illustration rather than limitation. In other implementation, segments may be any length and also may vary in length. It may be noted that in implementations, a segment may remain relatively small so that the computational overhead to perform a lookup also remains small. Similarly, in some implementations, two or more probe segments are to be found similar to respective reference segments prior to taking a remedial measure (e.g., rather than just one large segment). In some implementations, two or more probe segments are found to be similar to respective reference segments prior to determining that probe media item 201 is similar to reference media item 202.

System 200 also illustrates probe media item 201 being received by system 200 prior to reference media item 202. In some implementations, a media item that is received prior to other media items may also be transmitted or broadcast as a live-stream to user devices for consumption prior to the other media items. It may be noted that each segment of probe media item 201 is also received prior to the corresponding segment of reference media item 202 (e.g., P1 is received two minutes prior to R1, and P3 is received two minutes prior to R3). It may be noted that as segments of a media item are uploaded to system 200, the segments may also be transmitted as a live-stream via system 200 and transmitted as a live-stream with negligible delay from the time the segment is uploaded. It also may be noted that segments of a media item uploaded as a livestream are uploaded as the event occurs, and as such a 1-minute segment of a media item uploaded as a live-stream is received over approximately a 1-minute time interval, for example. It may be noted that live-stream similarity detection module 140 may perform similarity detection, as described herein, concurrently or serially with transmission of a media item as a live-stream to user devices.

As described above, a probe media item 201 (e.g., user uploaded media item) that is received prior to a reference media item 202 (e.g., owner uploaded media item) may present challenges for similarity detection. For example, as segment P1 of probe media item 201 is received by system 200, live-stream similarity detection module 140 may perform an initial lookup and perform a lookup of segment P1 after it is received by system 200. Since the reference media item 202 has yet to arrive at system 200, live-stream similarity detection module 140 may not detect a segment similar to segment P1 because the corresponding segment R1 of reference media item 202 has not yet been received and no similarity can be detected.

In some implementations, similarity detection module 140 may include fingerprint generator 210, delay unit 212, fingerprint similarity comparator 214, similarity score aggregator 216, similarity threshold comparator 218, and remedial action unit 220. In one implementation, probe media item 201 is received by live-stream similarity detection module 140 prior to reference media item 202. In some implementations, probe media item 201 or reference media item 202 are transmitted as a live-stream of the same event.

In one implementation, fingerprint generator 210 generates one or more fingerprints for a particular segment, such as segment P1, of probe media item 201. It may be noted that fingerprint as used herein, may refer to one or more fingerprints unless otherwise described.

In one implementation, once enough frames of probe media item 201 are received to constitute a segment (e.g., 1 minute segment of probe media item 201) and the corresponding fingerprint for the segment has been generated, live-stream similarity detection module 140 may initiate an initial lookup by performing a lookup of the segment (e.g. segment P1) by passing the fingerprint representing segment P1 (also referred to as "fingerprint P1" or "probe fingerprint P1") to the fingerprint similarity comparator 214. Fingerprint similarity comparator 214 receives the fingerprint P1 and compares fingerprint P1 to one or more fingerprints of one or more reference media items having been received prior to or at the same time as segment P1 of probe media item 201. The one or more reference fingerprints may be stored in data store 106. In the present example, since the corresponding segment R1 of reference media item 202 has yet to be received, live-stream similarity detection module 140 may not find a reference fingerprint similar to fingerprint P1.

In some implementations, fingerprint similarity comparator 214 may produce a similarity value. A similarity value may be a value assigned to a segment of the probe media item and indicative of whether or not a particular probe segment is similar to a reference segment of any reference media item. For example, the similarity value may be an integer (e.g., "1" for a similar segment, "0" for a non-similar segment). In another example, the similarity value may reflect a temporal length of the particular probe segment found similar to a reference segment. For example, a similarity value of 1 minute may be assigned to a 1-minute probe segment found similar to a reference segment. In another example, a similarity value of 2 minutes may be assigned to a 2-minute probe segment found similar to a reference segment, and so forth. A similarity value of "0" may be assigned to a probe segment that is not found similar to a reference segment. In the present example, no similarity is found for fingerprint P1 and similarity value of "0" may be assigned. The above similarity values are provided for purposes of illustration, rather than limitation. A similarity value may be expressed in any number of ways.

It may be noted that in some implementations in performing an initial lookup, fingerprint generator may bypass delay unit 212. The initial lookup may be performed with negligible delay after a segment, such as segment P1, of probe media item 201 is received by system 200. Delay unit 212 may be implemented in subsequent secondary lookups (e.g., to detect a similarity of a reference media item 202 received after probe media item 201). In implementations, fingerprint generator 210 may also pass fingerprints to delay unit 212 concurrent with the initial lookup, and delay unit 212 may wait a predetermined delay period before executing one or more secondary lookups.

In an implementation, the result (e.g., similarity value) of the comparison of fingerprint P1 of probe media item 201 with reference fingerprints may be sent to similarity score aggregator 216. Similarity score aggregator 216 may aggregate the received similarity value to previously received similarity values for probe media item 201 to generate a similarity score for the probe media item 201. A similarity score may be a value assigned to a probe media item and indicative of whether or not a particular probe media item is similar to any reference media item. In the present example, the present similarity value of "0" is the first similarity value, and the similarity value is aggregated with the similarity score to produce a similarity score of "0+0=0". It may be noted that the similarity values may be aggregated in numerous ways, such as by weighting one or more similarity values or using other functions. For the sake of illustration, rather than limitation, the similarity value may be aggregated by adding a new similarity value to the existing similarity score.

In an implementation, live-stream similarity detection module 140 may pass the similarity score associated with probe media item 201 to similarity threshold comparator 218 to compare the similarity score with one or more similarity thresholds defined by an administrator, for example. In response to the similarity score being greater or equal to one or more similarity thresholds, live-stream similarity detection module 140 may pass the information to remedial action unit 220 to initiate an appropriate remedial action. In the present example, a similarity score of "0" does not exceed any similarity thresholds, and no remedial action is taken against probe media item 201.

In some implementations, if no similarity is determined for fingerprint P1 and a fingerprint of any reference media item, live-stream similarity detection module 140 may terminate the initial lookup (e.g. not perform a lookup of P2-Pn). In other implementations, if no similarity is determined for fingerprint P1 and a fingerprint of any reference media item, live-stream similarity detection module 140 may wait a delay period to initiate a secondary lookup of fingerprint P1 (e.g., to detect a probe media item 201 similar to a reference media item 202 received after the probe media item 201). In other implementations, if live-stream similarity detection module 140 determines a similarity between fingerprint P1 and a reference fingerprint, live-stream similarity detection module 140 may continue to perform the initial lookup by performing similar operations as described above for one or more of additional segments P2 to Pn of probe media item 201 to detect a similarity to a reference media item 202 received prior to or at the same time as reference media item 202. In still other implementations, if live-stream similarity detection module 140 does not determine a similarity between fingerprint P1 and a reference fingerprint, live-stream similarity detection module 140 may continue the initial lookup by performing similar operations as described above for one or more of segments P2 to Pn (e.g., continue to perform the initial lookup for at least some number of non-similar (or contiguous non-similar) probe segments before terminating the initial lookup). It may be noted that numerous combinations of responses may be performed responsive to performing a lookup and detecting fingerprint P1 is similar to or not similar to a reference fingerprint.

In the present example, reference media item 202 is delayed by 2 minutes and live-stream similarity detection module 140 may not detect probe media item 201 as similar to reference media item 202 by performing an initial lookup using segments 203 of probe media item 201. It may be noted that in other examples where reference media item 202 is received prior to or at the same time as probe media item 201, live-stream similarity detection module 140 may detect the similarity between the two media items using the above described operations of the initial lookup.

In some implementations, live-stream similarity detection module 140 may perform one or more secondary lookups after a delay period. A delay period may be a period of time between receiving a particular segment of a media item by a system (e.g., system 200) to performing a lookup for the particular segment. For instance, a delay period of 3 minutes may indicate that after segment P1 is received by system 200 (e.g., at minute 1 on time axis 205), system 200 may perform a lookup of segment P1 after 3 minutes (e.g., at minute 4 on time axis 205). Similarly, a delay period of 3 minutes may indicate that after segment P2 is received by system 200 (e.g., at minute 2 on time axis 205), system 200 may perform a lookup of segment P2 after 3 minutes (e.g., at minute 5 on time axis 205). It may be noted that in the present example although the delay period is the same for segment P1 and P2, the corresponding lookup of P1 and P2 are performed at different times. It may be noted that delay period may be measured in other ways. In implementations, the secondary lookups may be performed after a delay period in the range of 2 minutes to 15 minutes. It may be noted that the delay period may be any amount of time, and may be chosen by operational considerations, among others.

In implementations, live-stream similarity detection module 140 may initiate a secondary lookup after a first delay period (e.g., 3 minute delay period) by causing delay unit 212 to pass a fingerprint of segment P1 to fingerprint similarity comparator 214. For instance, live-stream similarity detection module 140 may initiate a secondary lookup by performing a lookup of segment P1 at minute 4 on time axis 2015 (3 minute delay period). It may be noted that the fingerprint P1 may be stored in and retrieved from data store 106 after being generated by fingerprint generator 210 of system 200. Fingerprint similarity comparator 214 may compare fingerprint P1 to fingerprints of reference media items. Segment R1 of reference media item 202 is received by minute 3 of time axis 205. Segment R1 is passed to fingerprint generator 210 to produce a fingerprint for segment R1 of reference media item 202 (e.g., fingerprint R1). Since segment R1 is received within the first delay period, fingerprint R1 may be made available to fingerprint similarity comparator 214 for comparison to fingerprint P1. Fingerprint similarity comparator 214 compares fingerprint P1 to fingerprint R1 and determines a similarity, and produces a similarity value (e.g., similarity value of 1 minute representing the length of segment P1).

In an implementation, live-stream similarity detection module 140 may pass the similarity value for segment P1 to similarity score aggregator 216. Similarity score aggregator 216 may aggregate the similarity value (e.g., 1 minute) with the current similarity score (e.g., 0 minutes) to determine the new similarity score (e.g., 1 minute+0 minutes=1 minute–similarity score).

In an implementation, the live-stream similarity detection module 140 may pass the similarity score to similarity threshold comparator 218 to compare the similarity score with one or more similarity thresholds. In the present example, a first similarity threshold may be set at 2 minutes. Live-stream similarity detection module 140 may compare the similarity score (1 minute) to the first similarity threshold (2 minutes) and compute that the current similarity score is less than the first similarity threshold. Responsive to the similarity score not exceeding (or equaling) the first similarity threshold, live-stream similarity detection module 140 does not pass an indicator to remedial action unit 220 and no remedial action is taken on probe media item 201.

In implementations, live-stream similarity detection module 140 may continue the secondary lookup after the first delay period (e.g., 3 minute delay period) by causing delay unit 212 to pass a fingerprint of segment P2 of probe media item 201 to fingerprint similarity comparator 214. For instance, live-stream similarity detection module 140 may continue the secondary lookup by performing a lookup of segment P2 at minute 5 on time axis 2015 (3 minute delay period). It may be noted that the fingerprint P2 may be stored in and retrieved from data store 106. Fingerprint similarity comparator 214 may compare fingerprint P2 to fingerprints of reference media items. Segment R2 of reference media item 202 is received by minute 4 of time axis 205. R2 is passed to fingerprint generator 210 to produce a fingerprint for segment R2 or reference media item 202 (e.g., fingerprint R2). Since segment R2 is received within the first delay period associated with segment P2, fingerprint R2 may be made available to fingerprint similarity comparator 214 for comparison to fingerprint P2. Fingerprint similarity comparator 214 compares fingerprint P2 to fingerprint R2 and determines a similarity and produces a similarity value (e.g., similarity value of 1 minute representing the length of segment P2).

In an implementation, live-stream similarity detection module 140 may pass the similarity value for segment P2 to similarity score aggregator 216. Similarity score aggregator 216 may aggregate the similarity value (e.g., 1 minute) with the current similarity score (e.g., 1 minute) to determine the new similarity score (e.g., 1 minute+1 minute=2 minute-similarity score).

In an implementation, the live-stream similarity detection module 140 may pass the similarity score to similarity threshold comparator 218 to compare the similarity score with one or more similarity thresholds. In the present example, a single similarity threshold is implemented and is set at 2 minutes. Live-stream similarity detection module 140 may compare the similarity score (2 minutes) to the similarity threshold (2 minutes) and compute that the current similarity score is greater than or equal to the similarity threshold. Responsive to the similarity score exceeding or equaling the similarity threshold, live-stream similarity detection module 140 passes a corresponding indicator to remedial action unit 220.

In an implementation, remedial action unit 220 receives the indicator from similarity threshold comparator 218 indicating that the similarity score for probe media item 201 has exceeded or equaled the similarity threshold. Remedial action unit 220 may perform a number of remedial actions. In some implementations, the remedial actions may include sending a warning notification to a user account associated with the transmission of the probe media item 201. For example, an email may be sent to the user account requesting the user to stop the transmission of the probe media item 201. In some implementations, the remedial action may include muting the probe media item. For example, if the probe media item 201 is an audio media item, the sound of the audio content may be muted. In other implementations, the remedial action may include blocking a display of video content of the probe media item 201. For instance, if the probe media item 201 is a video media item, the video content of the probe media item 201 may be blocked from the user device while the audio content is presented to the user device. In other implementations, the remedial action may include terminating the transmission of the probe media item 201. For instance, the transmission of the probe media item 201 may be terminated to some or all user devices. In still other implementations, the remedial action may include suspending the user account associated with the transmission of the probe media item 201, so the user cannot re-upload the probe media item 201 from the same user account, for example.

In some implementations, a single similarity threshold may be used. If the similarity score exceeds or is equal to the single similarity threshold, live-stream similarity detection module 140 may execute one or more of the remedial actions described above. In other implementations, two or more similarity thresholds may be implemented. For example, a first similarity threshold may be set at 2 minutes and a second similarity threshold may be set at 4 minutes. If the similarity score is below both the first and the second similarity threshold, remedial action unit 220 may take no action. If the similarity score is greater than or equal to the first similarity threshold and below the second similarity threshold, a remedial action other than terminating the transmission of the probe media item 201 may be executed. For example, the remedial action unit 220 may perform the remedial action including at least one of sending a warning notification to a user account associated with the transmission of the probe media item 201, muting the probe media item 201, or blocking a display of video content of the probe media item 201. If the similarity score is greater than or equal to the second similarity threshold, remedial action unit 220 may terminate the transmission of the probe media item.

In implementations, live-stream similarity detection module 140 may continue the above described operations to execute the first secondary lookup for one or more of the remaining probe segments P3-Pn. In some implementations, live-stream similarity detection module 140 may continue the first secondary lookup for all the segments 203 of probe media item 201 or until one or more remedial actions (e.g. termination of transmission of probe media item 201) occurs, if at all. In some implementations, live-stream similarity detection module 140 may terminate the first secondary lookup after some number of segments 203 of probe media item 201 are found not to be similar to the segments of reference media item 202. For example, live-stream similarity detection module 140 may terminate the first secondary lookup after three consecutive segments of probe media item 201 are found not similar to reference media item 202. In some implementations, live-stream similarity detection module 140 performs one secondary lookup. In other implementations, live-stream similarity detection module 140 performs two secondary lookups. In still other implementations, live-stream similarity detection module 140 performs any number of secondary lookups. In some implementations, if live-stream similarity detection module 140 does not find the segment P1 of probe media item 201 (or two consecutive segments P1 and P2, for example), the first secondary lookup may be terminated and a second secondary lookup may be performed after a second delay period. It may be noted that additional secondary lookups may be performed as described herein, but with a different delay period (e.g., 7 minutes) than a preceding secondary lookup.

In some implementations, a fingerprint may refer to a signature of a first data item (e.g., the probe media item 201 or a segment of the probe media item 201 or frame of the probe media item 201) that may uniquely identify the first data item, and that can be mapped to a signature of a second data item (e.g., the reference media item 202 or a segment of the reference media item 202 or a frame of the reference media item 202) that may uniquely identify the second data item. In some examples, a media item or a segment of a media item may be input into a fingerprint function (e.g., a hash function) to generate a fingerprint representative of the media item or segment, respectively. In some implementations, a media item may be transformed into a sequence of multiple fingerprints where each fingerprint is representative of a different segment of the media item. In some implementations, each of a sequence of fingerprints represents a different non-overlapping segment of the media item. It may be noted that a fingerprint for a segment of a media item may include one or more fingerprints. For example, fingerprint generator 210 may generate a fingerprint for every ¼ second of a 1 minute segment. Fingerprint may refer to one or more fingerprints herein, unless otherwise described.

In an implementation, live-stream similarity detection module 140 may be used to compare fingerprints representative of segments of two video items to determine if the two video items are similar. In another implementation, live-stream similarity detection module 140 may be used to compare fingerprints representative of segments of two audio items to determine if the two audio items are similar. In still another implementation, the live-stream similarity detection module 140 may be used to compare two melodies to determine if the two melodies are similar. A melody may be data, such as a chord progression, sufficient to recognize a song. For example, two melodies may be considered similar (e.g., similarity score exceeds a similarity threshold) if the two melodies have roughly the same transitions between notes at roughly the same times. Melodies played at different pitches or speeds may be considered similar. Additionally, melodies may be considered similar even when one of the melodies has added a few notes or harmonics.

In some implementations, when enough segments of a probe media item 201 are found similar to segments of a reference media item 202 (e.g., equal or exceed a similarity threshold), live-stream similarity detection module 140 may determine that the probe media item 201 and reference media item 202 are similar. Similarity may be determined in multiple ways. For example, a similarity function may be implemented that quantitatively measures the similarity between two data items. In one example, a pair of fingerprints (e.g., fingerprint P1 and fingerprint R1) may be used as input for a similarity function. The similarity function may output a value indicative of the similarity between the two fingerprints. A similarity function may output a fingerprint pair similarity score between 0 and 1 (or a fingerprint pair similarity score of 0 or 1), where 1 is most similar and 0 is least similar. The fingerprint pair similarity score may be indicative of the similarity between the associated segments (e.g., segment P1 and segment R1). It may be noted that any number of similarity functions may be implemented such as the Euclidean (L2) distance between two fingerprints represented as vectors, cosine distance between two fingerprints represented as vectors, Kendall-Tau distance, or Hamming distance, for example.

Figure 3:
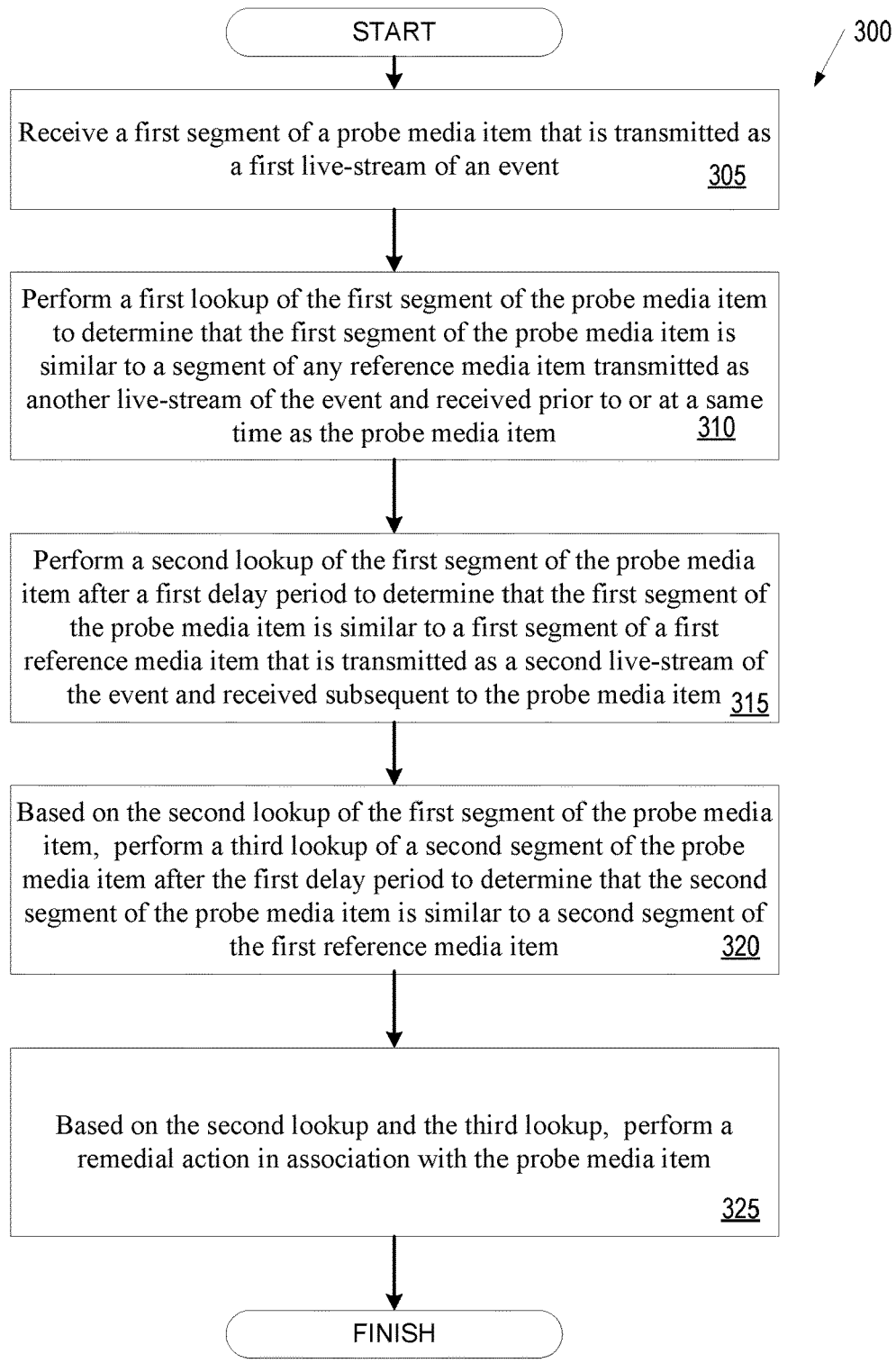
FIG. 3 is a flow diagram illustrating a method for determining similarities between media items using live-stream similarity detection module, in accordance with some implementations.

FIG. 3 is a flow diagram illustrating method 300 for determining similarities between media items using live-stream similarity detection module, in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In one implementation, live-stream similarity detection module 140 may perform some or all the operations described herein.

Method 300 begins at block 305 where processing logic receives a first segment of a probe media item that is transmitted as a first live-stream of an event. At block 310, processing logic responsive to receiving the first segment of the probe media item, initiates the initial lookup and performs a first lookup of the first segment of the probe media item to determine whether the first segment of the probe media item is similar to a segment of any reference media item transmitted as another live-stream of the event and received prior to or at a same time as the probe media item. At block 315, processing logic responsive to determining, based on the first lookup of the first segment of the probe media item, that the first segment of the probe media item is not similar to the segment of any reference media item, performs a second lookup of the first segment of the probe media item after a first delay period to determine whether the first segment of the probe media item is similar to a first segment of a first reference media item that is transmitted as a second live-stream of the event and received subsequent to the probe media item. At block 320, processing logic responsive to determining, based on the second lookup of the first segment of the probe media item, that the first segment of the probe media item is similar to the first segment of the first reference media item, performs a third lookup of a second segment of the probe media item after the first delay period to determine whether the second segment of the probe media item is similar to a second segment of the first reference media item. At block 325, processing logic responsive to determining, based on the second lookup and the third lookup, that the first segment and the second segment of the probe media item are respectively similar to the first segment and the second segment of the first reference media item, performs a remedial action in association with the probe media item.

Figure 4:
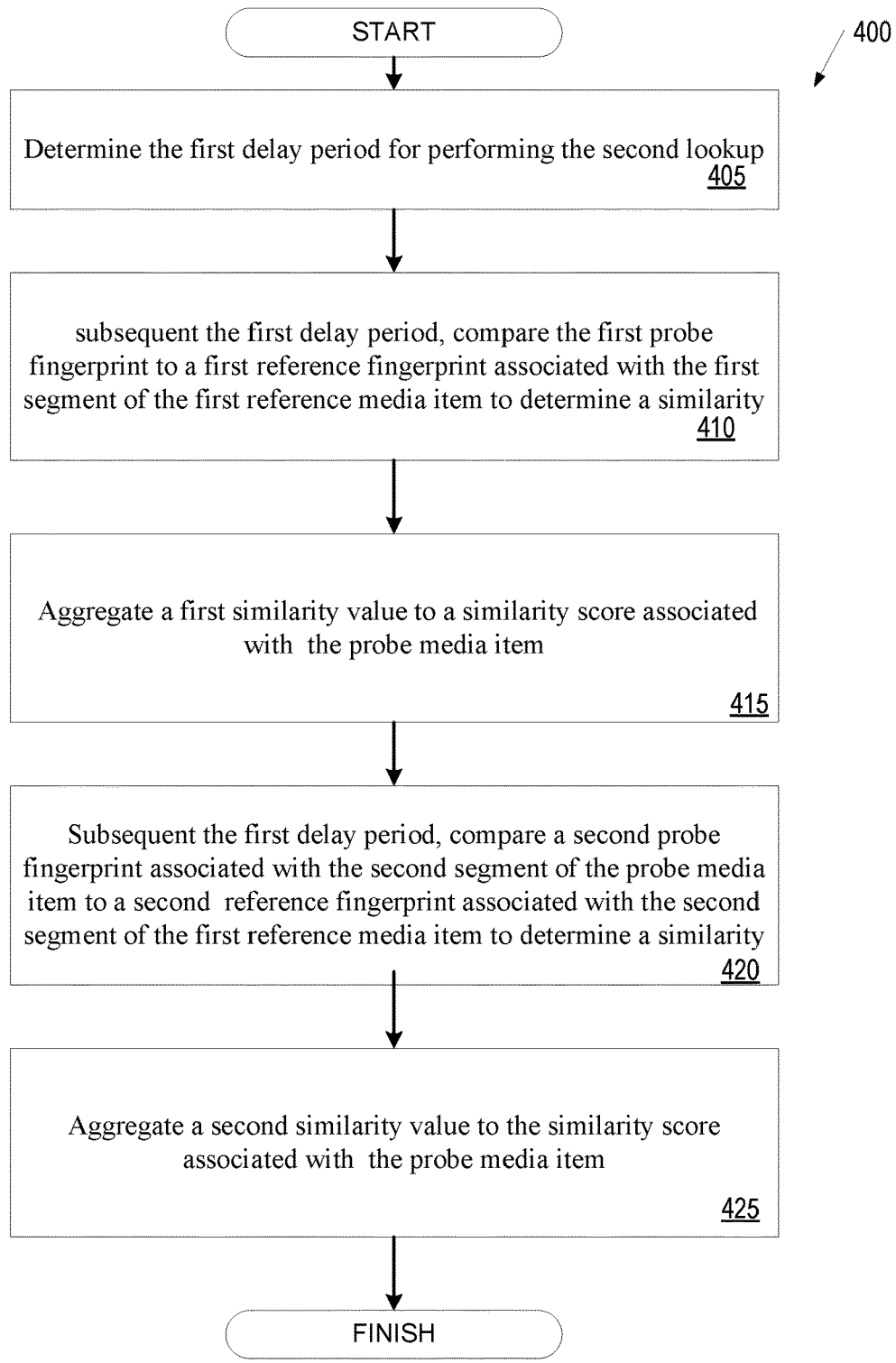
FIG. 4 is a flow diagram illustrating a method for determining similarity between a probe media item and reference media item received after the probe media item, in accordance with some implementations.

FIG. 4 is a flow diagram illustrating a method for determining similarity between a probe media item and reference media item received after the probe media item, in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In one implementation, live-stream similarity detection module 140 may perform some or all the operations described herein. Method 400 may describe operations to perform a second lookup of the first segment of the probe media item after a first delay period or performing a third lookup of a second segment of the probe media item after the first delay period. In some implementations, method 400 may represent operation of block 315 or block 320 of method 300 described with respect to FIG. 3.

Method 400 begins at block 405 where processing logic determines the first delay period for performing the second lookup. In implementations, live-stream similarity detection module 140 may communicate with delay unit 212 to determine the first delay period. In other implementations, the delay period may be part of the information stored in association with server 130, and may be retrieved by live-stream similarity detection module 140. At block 410, processing logic subsequent the first delay period, compares the first probe fingerprint to a first reference fingerprint associated with the first segment of the first reference media item to determine a similarity between the first segment of the probe media item and the first segment of the first reference media item. At block 415, processing logic responsive to determining the similarity between the first segment of the probe media item and the first segment of the first reference media item, aggregates a first similarity value with a similarity score associated with the probe media item. At block 420, processing logic subsequent the first delay period, compares a second probe fingerprint associated with the second segment of the probe media item to a second reference fingerprint associated with the second segment of the first reference media item to determine a similarity between the second segment of the probe media item and the second segment of the first reference media item. At block 425, processing logic responsive to determining the similarity between the second segment of the probe media item and the second segment of the first reference media item, aggregates a second similarity value to the similarity score associated with the probe media item.

Figure 5:
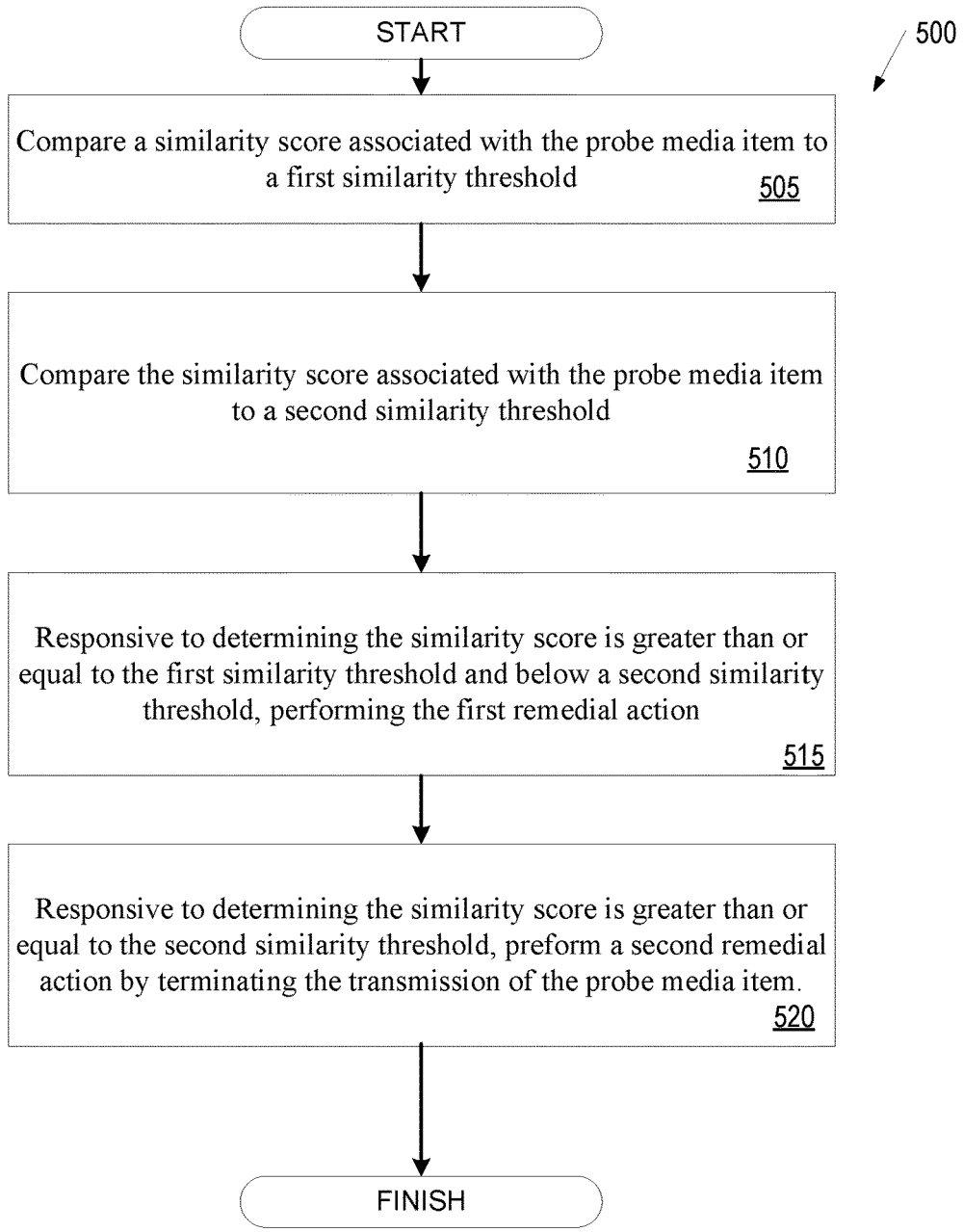
FIG. 5 is a flow diagram illustrating a method for performing a remedial action in association with a probe media item, in accordance with some implementations.

FIG. 5 is a flow diagram illustrating a method for performing a remedial action in association with a probe media item, in accordance with some implementations. Method 500 may be performed by processing logic that includes hardware (e.g., circuitry, dedicated logic, programmable logic, microcode), software (e.g., instructions run on a processing device to perform hardware simulation), or a combination thereof. In one implementation, live-stream similarity detection module 140 may perform some or all the operations described herein. In some implementations, method 500 may represent operation of block 325 of method 300 described with respect to FIG. 3.

Method 500 begins at block 505 where processing logic compares a similarity score associated with the probe media item to a first similarity threshold. The similarity score is indicative of a similarity between the probe media item and the first reference media item. At block 510, processing logic compares the similarity score associated with the probe media item to a second similarity threshold. At block 515, processing logic responsive to determining the similarity score is greater than or equal to the first similarity threshold and below a second similarity threshold, performs a first remedial action. The first remedial action may include at least one of sending a warning notification to a user account associated with the transmission of the probe media item, muting the probe media item, or blocking a display of video content of the probe media item. At block 520, processing logic responsive to determining the similarity score is greater than or equal to the second similarity threshold, performs a second remedial action by terminating the transmission of the probe media item. The second remedial action is different from the first remedial action For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be noted that the processes disclosed in this specification are capable of being stored on an article of manufacture to facilitate transporting and transferring such processes to computing devices. The term "article of manufacture," as used herein, is intended to encompass a computer program accessible from a non-transitory computer-readable device or storage media.

Figure 6:
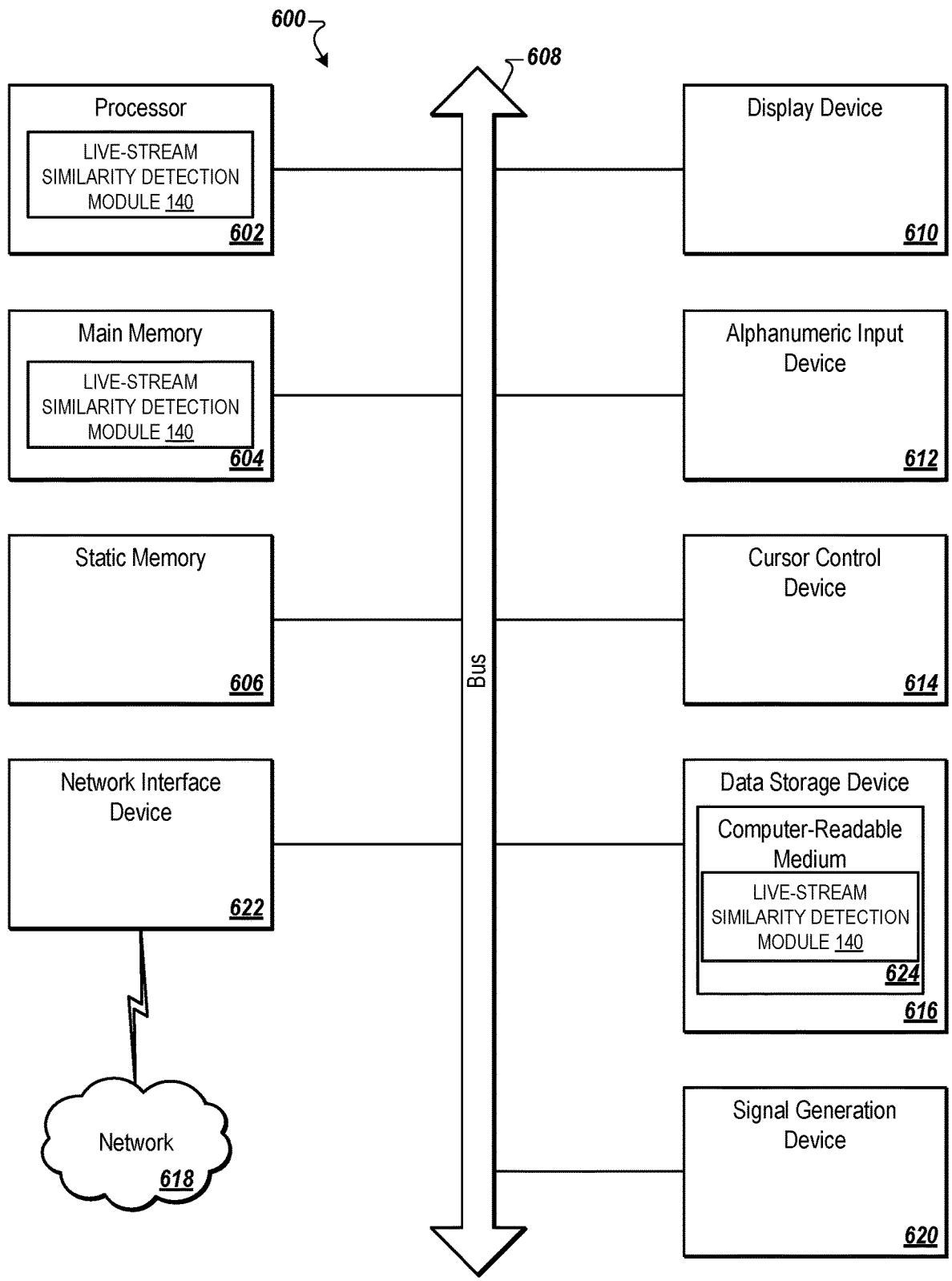
FIG. 6 is a block diagram illustrating an exemplary computer system, according to some implementations.

FIG. 6 is a block diagram illustrating an exemplary computer system 600. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of live-stream similarity detection module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the live-stream similarity detection module 140 for performing the operations and steps discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and live-stream similarity detection module 140 embodying any one or more of the methodologies or functions described herein. The sets of instructions of the system architecture 100 and live-stream similarity detection module 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "comparing", "determining", "generating", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
receiving, by a content sharing platform, a first segment of a probe media item that is transmitted as a first live-stream of an event;
determining, after a first delay period, whether the first segment of the probe media item is similar to a first segment of a first reference media item that is transmitted as a second live-stream of the event, wherein the first reference media item is received, by the content sharing platform and from a device external to the content sharing platform, subsequent to receiving the probe media item and wherein the first delay period indicates a predetermined delay in time from the receiving of the first segment of the probe media item by the content sharing platform to a performance of a lookup operation by the content sharing platform; and
responsive to determining, after the first delay period subsequent to receiving the first segment, that the first segment is similar to the first segment of the first reference media item, performing a remedial action in association with the probe media item.

2. The method of claim 1, further comprising:
determining whether the first segment of the probe media item is similar to a first segment of any reference media item transmitted as another live-stream of the event and received no later than the probe media item, wherein determining, after the first delay period, whether the first segment of the probe media item is similar to the first segment of the first reference media item that is transmitted as the second live-stream of the event and received subsequent to the probe media item is performed responsive to determining that the first segment of the probe media item is not similar to the first segment of any reference media item received no later than the probe media item.

3. The method of claim 2, wherein determining whether the first segment of the probe media item is similar to a first segment of any reference media item transmitted as another live-stream of the event and received no later than the probe media item comprises:
generating a first probe fingerprint for the first segment of the probe media item; and
comparing the first probe fingerprint to a plurality of reference fingerprints associated with a plurality of segments for a plurality of reference media items received no later than the probe media item to determine a similarity between the first segment of the probe media item and the segment of the any reference media item of the plurality of reference media items.

4. The method of claim 3, wherein determining, after the first delay period, whether the first segment of the probe media item is similar to the first segment of the first reference media item that is transmitted as the second live-stream of the event and received subsequent to the probe media item comprises:
determining the first delay period;
subsequent the first delay period, comparing the first probe fingerprint to a first reference fingerprint associated with the first segment of the first reference media item to determine a similarity between the first segment of the probe media item and the first segment of the first reference media item; and
responsive to determining the similarity between the first segment of the probe media item and the first segment of the first reference media item, aggregating a first similarity value to a similarity score associated with the probe media item.

5. The method of claim 1, further comprising:
determining, after a second delay period, whether a second segment of the probe media item is similar to a second segment of the first reference media item.

6. The method of claim 1, further comprising:
responsive to determining that the first segment of the probe media item is not similar to the first segment of the first reference media item received subsequent to the probe media item, determining, after a third delay period, whether the first segment of the probe media item is similar to a first segment of a second reference media item that is transmitted as a third live-stream of the event and received subsequent to the probe media item;
responsive to determining, after the third delay period, that the first segment of the probe media item is similar to the first segment of the second reference media item received subsequent the probe media item, determining after a fourth delay period whether a second segment of the probe media item is similar to a second segment of the second reference media item; and
responsive to determining, after the fourth delay period, that the first segment and the second segment of the probe media item are respectively similar to the first segment and the second segment of the second reference media item, performing the remedial action in association with the probe media item.

7. The method of claim 1, wherein performing the remedial action in association with the probe media item comprises:

comparing a similarity score associated with the probe media item to a first similarity threshold, wherein the similarity score is indicative of a similarity between the probe media item and the first reference media item; and
responsive to determining the similarity score is greater than or equal to the first similarity threshold, performing the remedial action.

8. The method of claim 7, wherein the remedial action comprises one of sending a warning notification to a user account associated with the transmission of the probe media item, muting the probe media item, blocking a display of video content of the probe media item, or terminating the transmission of the probe media item.

9. The method of claim 7, wherein performing the remedial action in association with the probe media item further comprises:
comparing the similarity score associated with the probe media item to a second similarity threshold;
responsive to determining the similarity score is greater than or equal to the first similarity threshold and below a second similarity threshold, performing a first remedial action comprising at least one of sending a warning notification to a user account associated with the transmission of the probe media item, muting the probe media item, or blocking a display of video content of the probe media item; and
responsive to determining the similarity score is greater than or equal to the second similarity threshold, performing a second remedial action by terminating the transmission of the probe media item.

10. A system comprising:
a memory; and
a processing device, coupled to the memory, to:
receive, by a content sharing platform, a first segment of a probe media item that is transmitted as a first live-stream of an event;
determine, after a first delay period, whether the first segment of the probe media item is similar to a first segment of a first reference media item that is transmitted as a second live-stream of the event, wherein the first reference media item is received, by the content sharing platform and from a device external to the content sharing platform, subsequent to the probe media item, and wherein the first delay period indicates a predetermined delay in time from the receiving of the first segment of the probe media item by the content sharing platform to a performance of a lookup operation by the content sharing platform; and
responsive to determining, after the first delay period subsequent to receiving the first segment, that the first segment is similar to the first segment of the first reference media item, perform a remedial action in association with the probe media item.

11. The system of claim 10, wherein the processing device further to:
determine whether the first segment of the probe media item is similar to a first segment of any reference media item transmitted as another live-stream of the event and received no later than the probe media item, wherein determining, after the first delay period, whether the first segment of the probe media item is similar to the first segment of the first reference media item that is transmitted as the second live-stream of the event and received subsequent to the probe media item is performed responsive to determining that the first segment of the probe media item is not similar to the first segment of any reference media item received no later than the probe media item.

12. The system of claim 10, wherein the processing device further to:
    determine, after a second delay period, whether a second segment of the probe media item is similar to a second segment of the first reference media item.

13. The system of claim 10, wherein to perform the remedial action in association with the probe media item, the processing device to:
    compare a similarity score associated with the probe media item to a first similarity threshold, wherein the similarity score is indicative of a similarity between the probe media item and the first reference media item; and
    responsive to determining the similarity score is greater than or equal to the first similarity threshold, perform the remedial action.

14. The system of claim 13, wherein the remedial action comprises one of sending a warning notification to a user account associated with the transmission of the probe media item, muting the probe media item, blocking a display of video content of the probe media item, or terminating the transmission of the probe media item.

15. The system of claim 13, wherein to perform the remedial action in association with the probe media item, the processing device further to:
    compare the similarity score associated with the probe media item to a second similarity threshold;
    responsive to determining the similarity score is greater than or equal to the first similarity threshold and below a second similarity threshold, perform a first remedial action comprising at least one of sending a warning notification to a user account associated with the transmission of the probe media item, muting the probe media item, or blocking a display of video content of the probe media item; and
    responsive to determining the similarity score is greater than or equal to the second similarity threshold, perform a second remedial action by terminating the transmission of the probe media item.

16. A non-transitory computer readable medium that stores instruction that, when executed by a processing device, cause the processing device to perform operations comprising:
    receiving, by a content sharing platform, a first segment of a probe media item that is transmitted as a first live-stream of an event;
    determining, after a first delay period, whether the first segment of the probe media item is similar to a first segment of a first reference media item that is transmitted as a second live-stream of the event, wherein the first reference media item is received, by the content sharing platform and from a device external to the content sharing platform, subsequent to the probe media item, and wherein the first delay period indicates a predetermined delay in time from the receiving of the first segment of the probe media item by the content sharing platform to a performance of a lookup operation by the content sharing platform; and
    responsive to determining, after the first delay period subsequent to receiving the first segment, that the first segment is similar to the first segment of the first reference media item, performing a remedial action in association with the probe media item.

17. The non-transitory computer readable medium of claim 16, the operations further comprising:
    determining whether the first segment of the probe media item is similar to a first segment of any reference media item transmitted as another live-stream of the event and received no later than the probe media item, wherein determining, after the first delay period, whether the first segment of the probe media item is similar to the first segment of the first reference media item that is transmitted as the second live-stream of the event and received subsequent to the probe media item is performed responsive to determining that the first segment of the probe media item is not similar to the first segment of any reference media item received no later than the probe media item.

18. The non-transitory computer readable medium of claim 16, the operations further comprising:
    determining, after a second delay period, whether a second segment of the probe media item is similar to a second segment of the first reference media item.

19. The non-transitory computer readable medium of claim 18, wherein performing a remedial action in association with the probe media item comprises:
    comparing a similarity score associated with the probe media item to a first similarity threshold, wherein the similarity score is indicative of a similarity between the probe media item and the first reference media item; and
    responsive to determining the similarity score is greater than or equal to the first similarity threshold, performing the remedial action.

20. The non-transitory computer readable medium of claim 19, wherein the remedial action comprises one of sending a warning notification to a user account associated with the transmission of the probe media item, muting the probe media item, blocking a display of video content of the probe media item, or terminating the transmission of the probe media item.

* * * * *